US012030553B2

(12) United States Patent
Sakata et al.

(10) Patent No.: US 12,030,553 B2
(45) Date of Patent: Jul. 9, 2024

(54) VEHICLE STRUCTURE

(71) Applicants: TOYOTA JIDOSHA KABUSHIKI KAISHA, Toyota (JP); SUBARU CORPORATION, Tokyo (JP)

(72) Inventors: Marie Sakata, Toyota (JP); Masayuki Tado, Toyota (JP); Naoya Kidokoro, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 349 days.

(21) Appl. No.: 17/701,994

(22) Filed: Mar. 23, 2022

(65) Prior Publication Data

US 2022/0306212 A1 Sep. 29, 2022

(30) Foreign Application Priority Data

Mar. 26, 2021 (JP) ................................. 2021-053798

(51) Int. Cl.
*B62D 25/14* (2006.01)
*B60K 35/00* (2006.01)
(Continued)

(52) U.S. Cl.
CPC .............. *B62D 25/14* (2013.01); *B60K 35/00* (2013.01); *B60K 35/50* (2024.01); *B60K 35/60* (2024.01);
(Continued)

(58) Field of Classification Search
CPC ............ B62D 25/14; B60R 2011/0005; B60R 11/0235; B60R 11/0258; B60R 13/0256;
(Continued)

(56) References Cited

U.S. PATENT DOCUMENTS 4,194,587 A * 3/1980 Shino ........................ B60Q 3/10
180/90
4,942,499 A * 7/1990 Shibata ............... B60R 16/0239
361/825
(Continued)

FOREIGN PATENT DOCUMENTS

CN 102498433 A 6/2012
CN 109313965 A 2/2019
(Continued)

*Primary Examiner* — Jason S Morrow
(74) *Attorney, Agent, or Firm* — Sughrue Mion, PLLC (57) ABSTRACT

A vehicle structure includes an instrument panel, an in-vehicle device projecting toward a vehicle-upper side with respect to an upper surface of the instrument panel, and a cover panel that covers the in-vehicle device to expose a front surface of the in-vehicle device to a vehicle cabin. The cover panel includes an upper panel portion facing at least an upper part of a back surface of the in-vehicle device, and a lower panel portion facing at least a lower part of the back surface of the in-vehicle device and connected to the upper panel portion. The in-vehicle device includes a terminal provided on the back surface and configured such that a connector of a harness is connectable to the terminal, and a regulation member configured to regulate a position of the harness to a vehicle-lower side with respect to the terminal when the connector is connected to the terminal.

5 Claims, 6 Drawing Sheets

(51) Int. Cl.
  *B60K 35/50* (2024.01)
  *B60K 35/60* (2024.01)
  *B60K 37/20* (2024.01)

(52) U.S. Cl.
  CPC .......... *B60K 37/20* (2024.01); *B60K 2360/40* (2024.01); *B62D 25/145* (2013.01)

(58) Field of Classification Search
  CPC .... B60R 16/0215; B60K 37/00; B60K 37/10; B60K 37/20; B60K 35/50; B60K 35/60; B60K 2360/40
  USPC .............. 296/70; 348/837; 248/27.1; 180/90
  See application file for complete search history.

(56) References Cited

U.S. PATENT DOCUMENTS

| | | | | |
|---|---|---|---|---|
| 5,324,203 | A * | 6/1994 | Sano | B60K 35/50 174/72 A |
| 6,092,854 | A * | 7/2000 | Campbell | B60R 13/0846 296/70 |
| 6,702,356 | B2 * | 3/2004 | Kondo | B60K 37/00 296/70 |
| 6,779,826 | B2 * | 8/2004 | Nakajima | B60K 35/50 381/86 |
| 7,623,958 | B1 * | 11/2009 | Laverick | G01C 21/36 361/679.01 |
| 8,272,675 | B2 * | 9/2012 | Fowler | B60K 35/60 296/70 |
| 10,076,957 | B2 * | 9/2018 | Inagaki | B60R 11/0264 |
| 10,144,362 | B2 * | 12/2018 | Suzuki | B60K 35/50 |
| 10,266,127 | B2 * | 4/2019 | Glass, II | B60R 7/06 |
| 10,946,807 | B2 * | 3/2021 | Jones, Jr. | B60R 11/0217 |
| 11,015,740 | B2 * | 5/2021 | Nakano | B60R 16/0215 |
| 11,208,058 | B2 * | 12/2021 | Yamaguchi | B60R 16/0215 |
| 11,577,609 | B2 * | 2/2023 | Marietta | B60K 35/50 |
| 11,904,689 | B2 * | 2/2024 | Matsuoka | B60K 35/00 |
| 2001/0048212 | A1 * | 12/2001 | Tsuji | B62K 11/14 280/288.4 |
| 2009/0194349 | A1 * | 8/2009 | Myers | B62D 1/16 180/90 |
| 2009/0284038 | A1 * | 11/2009 | Sato | B60K 37/00 296/72 |
| 2010/0259063 | A1 * | 10/2010 | Wippler | B60R 16/0215 296/70 |
| 2012/0139283 | A1 * | 6/2012 | Ono | B62D 25/145 296/70 |
| 2012/0162571 | A1 | 6/2012 | Ohkoshi | |
| 2014/0125876 | A1 * | 5/2014 | Nakayama | B60K 35/60 348/837 |
| 2015/0129724 | A1 * | 5/2015 | Kohmoto | F16M 13/00 248/316.4 |
| 2018/0022216 | A1 * | 1/2018 | Connolly | B60K 35/00 296/70 |
| 2019/0217792 | A1 | 7/2019 | Kawaguchi et al. | |
| 2022/0097618 | A1 * | 3/2022 | Rhyne | B60K 35/22 |
| 2022/0306212 | A1 * | 9/2022 | Sakata | B62D 25/145 |

FOREIGN PATENT DOCUMENTS

| | | |
|---|---|---|
| JP | 61-102338 A | 5/1986 |
| JP | 2000-142177 A | 5/2000 |
| JP | 2019-147490 A | 9/2019 |

* cited by examiner

VEHICLE STRUCTURE

CROSS-REFERENCE TO RELATED APPLICATION

This application claims priority to Japanese Patent Application No. 2021-053798 filed on Mar. 26, 2021, incorporated herein by reference in its entirety.

BACKGROUND

1. Technical Field

The technology disclosed herein relates to a vehicle structure.

2. Description of Related Art

There is known a vehicle structure including an in-vehicle device projecting from the upper surface of an instrument panel toward an upper side of the vehicle, and a cover panel that covers the in-vehicle device. An example of such a vehicle structure is disclosed in Japanese Unexamined Patent Application Publication No. 2019-147490 (JP 2019-147490 A).

SUMMARY

In such a vehicle structure, the in-vehicle device projects from the upper surface of the instrument panel toward the upper side of the vehicle. Therefore, the cover panel that covers the in-vehicle device is located on the outermost surface. In such a vehicle structure, it is desirable that the cover panel be composed of a plurality of panel portions in consideration of workability for attaching the cover panel and the in-vehicle device to the instrument panel. For example, when cleaning the cover panel, water may enter the cover panel from a connection portion between the panel portions and adhere to a terminal provided on the back surface of the in-vehicle device. The present specification provides a waterproof technology for suppressing water adhesion to the terminal provided on the back surface of the in-vehicle device.

A vehicle structure according to one embodiment disclosed herein includes an instrument panel, an in-vehicle device projecting toward a vehicle-upper side with respect to an upper surface of the instrument panel, and a cover panel configured to cover the in-vehicle device to expose a front surface of the in-vehicle device to a vehicle cabin. The cover panel includes an upper panel portion facing at least an upper part of a back surface of the in-vehicle device, and a lower panel portion facing at least a lower part of the back surface of the in-vehicle device and connected to the upper panel portion. The in-vehicle device includes a terminal provided on the back surface and configured such that a connector of a harness is connectable to the terminal, and a regulation member configured to regulate a position of the harness to a vehicle-lower side with respect to the terminal when the connector is connected to the terminal.

In the vehicle structure disclosed herein, the position of the harness is regulated to the vehicle-lower side with respect to the terminal. Therefore, it is possible to reduce the occurrence of a case where water that has entered the cover panel adheres to the terminal along the harness.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle structure according to one embodiment disclosed herein includes an instrument panel, an in-vehicle device projecting toward a vehicle-upper side with respect to an upper surface of the instrument panel, and a cover panel configured to cover the in-vehicle device to expose a front surface of the in-vehicle device to a vehicle cabin. The cover panel includes an upper panel portion facing at least an upper part of a back surface of the in-vehicle device, and a lower panel portion facing at least a lower part of the back surface of the in-vehicle device and connected to the upper panel portion. The in-vehicle device includes a terminal provided on the back surface and configured such that a connector of a harness is connectable to the terminal, and a regulation member configured to regulate a position of the harness to a vehicle-lower side with respect to the terminal when the connector is connected to the terminal. The type of the in-vehicle device is not particularly limited. Examples of the in-vehicle device include a display that displays various measured values (for example, speed or engine or motor speed), and a camera module that images the outside or inside of the vehicle cabin.

In the vehicle structure according to the embodiment described above, the regulation member may include a plate member projecting from the back surface on the vehicle-lower side with respect to the terminal. The plate member may be configured to restrict movement of the harness toward the vehicle-upper side. The position of the harness can be regulated by using the regulation member having the simple structure.

In the vehicle structure according to the embodiment described above, when the connector is connected to the terminal, the harness may be connected to the connector along a vehicle width direction. When the harness is connected to the connector along the vehicle width direction, there is a strong possibility that water may adhere to the terminal along the harness. Even in such a case, the position of the harness is regulated by the regulation member, thereby reducing the occurrence of the case where the water that has entered the cover panel adheres to the terminal along the harness.

In the vehicle structure according to the embodiment described above, in a connection portion where the upper panel portion and the lower panel portion are connected together, an end of the upper panel portion on a vehicle-front side may be located on the vehicle-lower side with respect to an end of the lower panel portion on a vehicle-rear side. In this case, a tip of the upper panel portion on the vehicle-front side in the connection portion may be positioned on the vehicle-front side with respect to the connector of the harness in a cross section perpendicular to the vehicle width direction. When the end of the upper panel portion on the vehicle-front side is located on the vehicle-lower side with respect to the end of the lower panel portion on the vehicle-rear side, the water that has entered the cover panel from the connection portion drops from the tip of the upper panel portion on the vehicle-front side. Since the tip of the upper panel portion on the vehicle-front side is positioned on the vehicle-front side with respect to the connector of the harness, it is possible to reduce the occurrence of a case where the dropping water adheres to the terminal along the connector of the harness.

In the vehicle structure according to the embodiment described above, when viewed from the vehicle-upper side, the end of the upper panel portion on the vehicle-front side may project at a position in correspondence with the terminal of the in-vehicle device.

Figure 1:
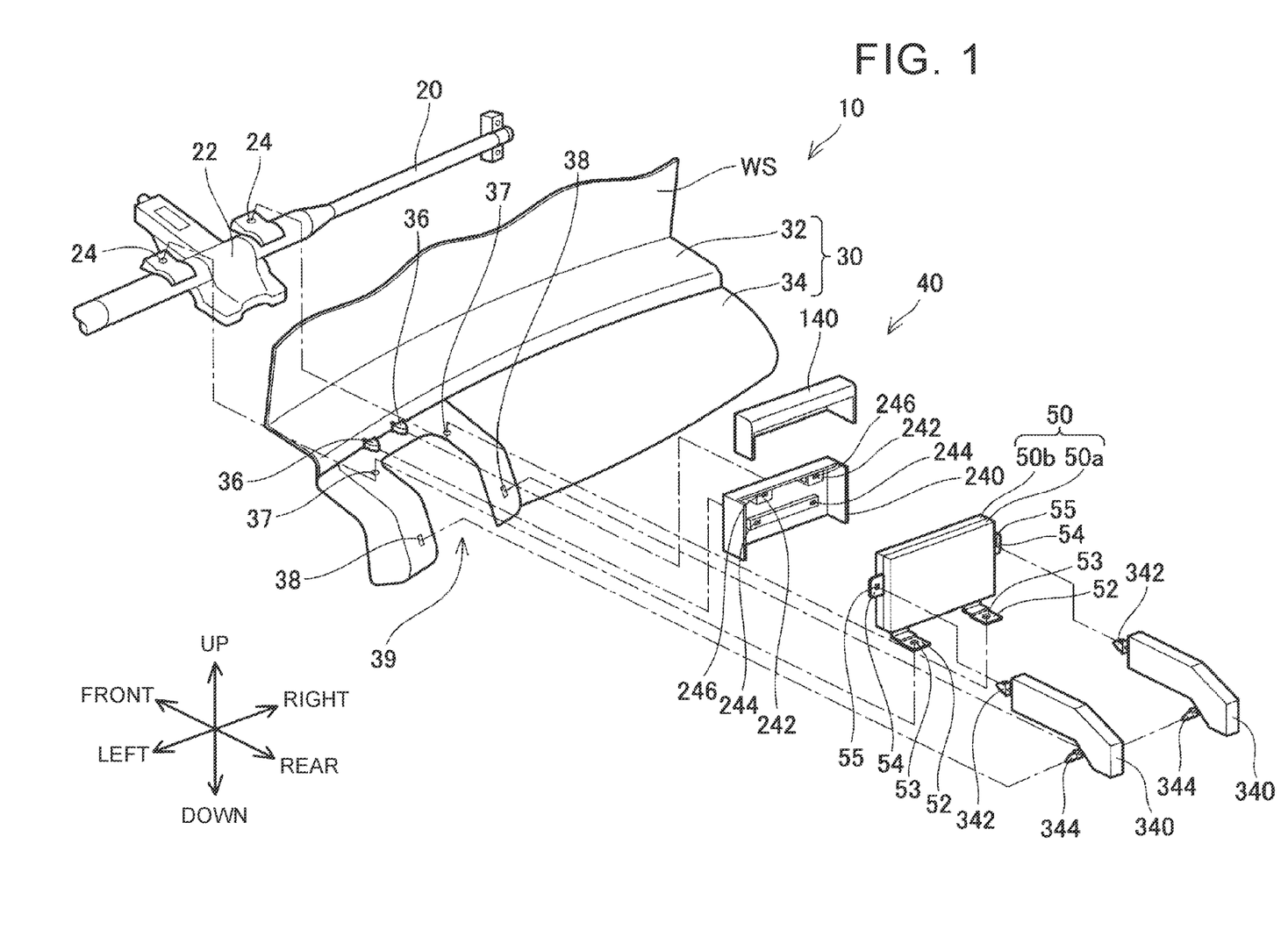
FIG. 1 is a schematic exploded perspective view of a vehicle structure.

A vehicle structure 10 provided on a front side of a vehicle will be described below with reference to the drawings. As illustrated in FIG. 1, the vehicle structure 10 includes an instrument panel reinforcement 20, a windshield WS, an instrument panel 30, a cover panel 40, and an in-vehicle device 50. In FIG. 1, each component is simply illustrated for the purpose of clear illustration. For example, various mechanisms such as an air outlet for air-conditioning and an opening for a center console in the instrument panel 30 are omitted from the illustration. In this example, the cover panel 40 is provided separately from the instrument panel 30, but may be integrated with the instrument panel 30.

Instrument Panel Reinforcement

As illustrated in FIG. 1, the instrument panel reinforcement 20 is provided behind the instrument panel 30 (lower side in front of the instrument panel 30 in the vehicle), and supports the instrument panel 30. The instrument panel reinforcement 20 extends along a vehicle width direction. The right end is fixed to a right front pillar (not illustrated). The left end is fixed to a left front pillar (not illustrated). In this way, the instrument panel reinforcement 20 is fixed to a skeleton of the vehicle. The instrument panel reinforcement 20 has a steering support 22 for supporting a steering column (not illustrated) and a steering wheel (not illustrated). Brackets are fixed to the right and left ends of the steering support 22. The brackets have insertion holes 24 (see FIGS. 1 and 3) where fasteners such as bolts for fixing the in-vehicle device 50 are inserted.

Instrument Panel

As illustrated in FIG. 1, the instrument panel 30 is provided on a front side of a vehicle cabin in the vehicle, and extends along the vehicle width direction. The instrument panel 30 is not particularly limited, but the surface exposed to the vehicle cabin may be composed of two stages. The instrument panel 30 may include an upper instrument panel portion 32 constituting an upper stage of the instrument panel 30, and a lower instrument panel portion 34 constituting a lower stage of the instrument panel 30. The upper instrument panel portion 32 is a substantially flat surface slightly inclined from the front side of the vehicle to a lower rear side of the vehicle. The lower instrument panel portion 34 is a curved surface that curves from the front side of the vehicle to a rear side of the vehicle, and is convex toward the rear side of the vehicle. An opening 39 in the lower instrument panel portion 34 is a portion where the steering column (not illustrated) is arranged. The upper instrument panel portion 32 and the lower instrument panel portion 34 may be provided separately or integrally.

The instrument panel 30 includes a pair of clips 36 for fixing the cover panel 40. The clips 36 are not particularly limited, but may be provided on a wall extending between the upper instrument panel portion 32 and the lower instrument panel portion 34. Although detailed description will be given later, the instrument panel 30 further has a pair of insertion holes 37 where fasteners such as bolts are inserted, and a pair of fitting holes 38 where clips are fitted.

Cover Panel

As illustrated in FIG. 1, the cover panel 40 is a cover member surrounding the back surface, the upper surface, and the side surfaces of the in-vehicle device 50 to expose the front surface of the in-vehicle device 50 to the vehicle cabin. The cover panel 40 is fixed to the upper surface of the instrument panel 30 in front of the steering wheel (not illustrated). The cover panel 40 includes an upper panel portion 140, a lower panel portion 240, and a pair of side panel portions 340. In the upper panel portion 140, the lower panel portion 240, and the side panel portions 340, a portion constituting an outer profile of the cover panel 40 is herein referred to as "body".

Figure 2:
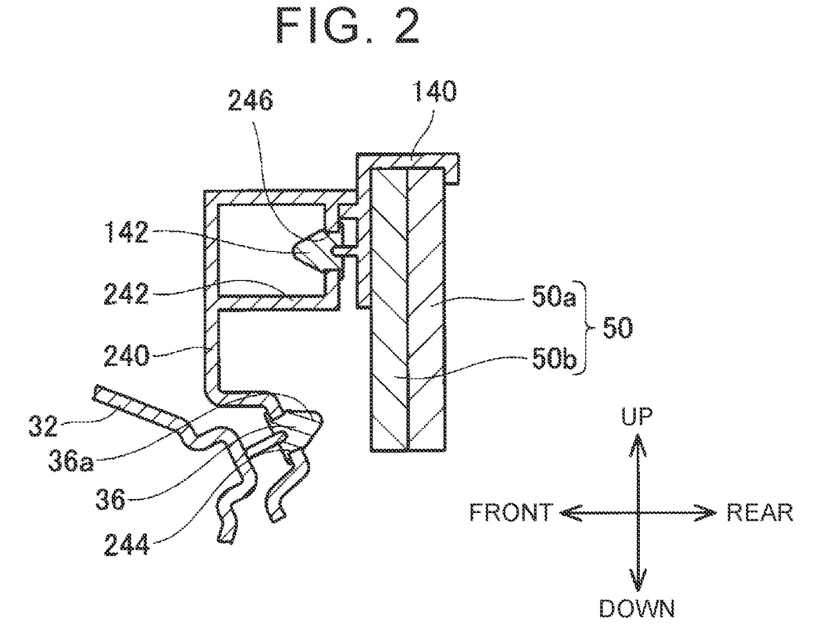
FIG. 2 is a schematic sectional view of a main part of a cross section perpendicular to a vehicle width direction, including a clip provided on an instrument panel and a clip provided on an upper panel portion.
Figure 3:
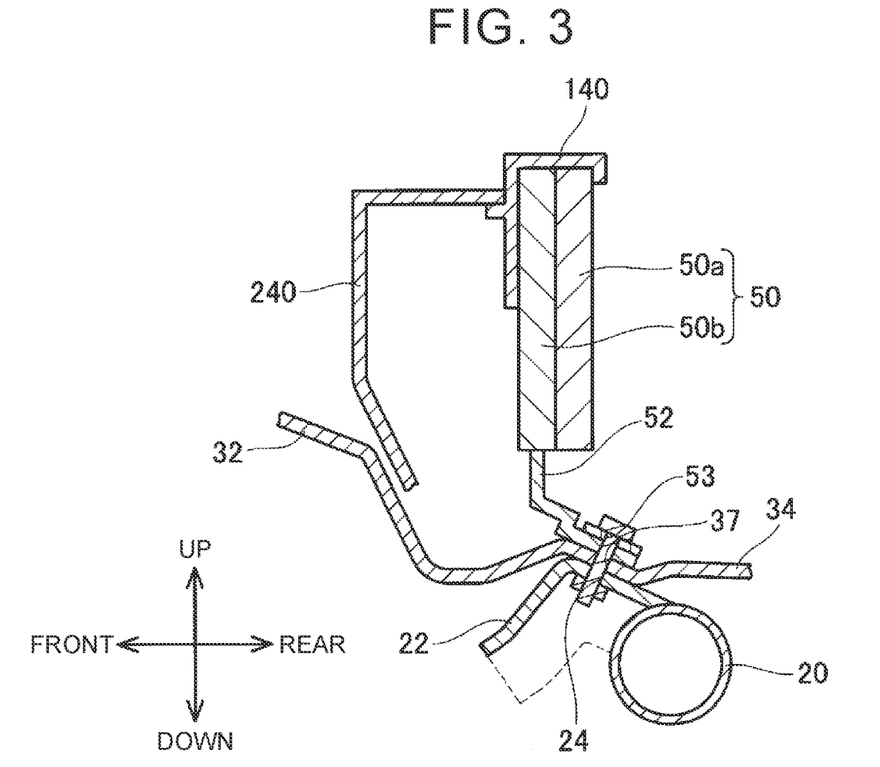
FIG. 3 is a schematic sectional view of a main part of a cross section perpendicular to the vehicle width direction, including an insertion hole in a fixing bracket provided in an in-vehicle device.

As illustrated in FIGS. 1 to 3, the upper panel portion 140 faces the back surface, the upper surface, and the side surfaces of an upper part of the in-vehicle device 50, and covers the upper part of the in-vehicle device 50. The upper panel portion 140 is fixed to the in-vehicle device 50 with fasteners (not illustrated) such as screws. As illustrated in FIG. 2, the upper panel portion 140 further includes clips 142 extending toward the front side of the vehicle at positions where the upper panel portion 140 faces the back surface of the in-vehicle device 50. The upper panel portion 140 is fixed to the lower panel portion 240 via the clips 142. The upper panel portion 140 includes two clips 142 along the vehicle width direction.

As illustrated in FIGS. 1 to 3, the lower panel portion 240 faces the back surface and the side surfaces of a lower part of the in-vehicle device 50, and covers the lower part of the in-vehicle device 50. As illustrated in FIGS. 1 and 2, the lower panel portion 240 has a recess in a part of its rear wall, and a pair of fitting holes 244 in the recess. As illustrated in FIG. 2, the clips 36 of the instrument panel 30 are fitted into the fitting holes 244. Each of the clips 36 has an elastic piece 36a at its tip. When the clip 36 is inserted into the fitting hole 244, the elastic piece 36a is press-fitted into the fitting hole 244 and engages with a surrounding wall defining the fitting hole 244. In this way, the lower panel portion 240 is fixed to the instrument panel 30 via a fitting mechanism including the clips 36 and the fitting holes 244. The type of the clip 36 is not particularly limited, and any other type of clip may be adopted. Regarding the other clips 142, 342, and 344 described later, the same type of clip as that of the clip 36 is adopted, but any other type of clip may be adopted.

As illustrated in FIGS. 1 and 2, the lower panel portion 240 includes a pair of attachment portions 242 where the in-vehicle device 50 is attached. The attachment portions 242 are provided on an upper part of the inner surface of the body constituting the outer profile. The attachment portions 242 have fitting holes 246. As illustrated in FIG. 2, the clips 142 of the upper panel portion 140 are fitted into the fitting holes 246. As described above, the upper panel portion 140 is fixed to the in-vehicle device 50 with the fasteners (not illustrated) such as screws. Therefore, the in-vehicle device 50 is attached to the attachment portions 242 of the lower panel portion 240 via the upper panel portion 140. The lower panel portion 240 may be formed by injection molding, but is not particularly limited. Therefore, in the lower panel portion 240, the body constituting the outer profile is integrated with the attachment portions 242 where the in-vehicle device 50 is attached.

Figure 4:
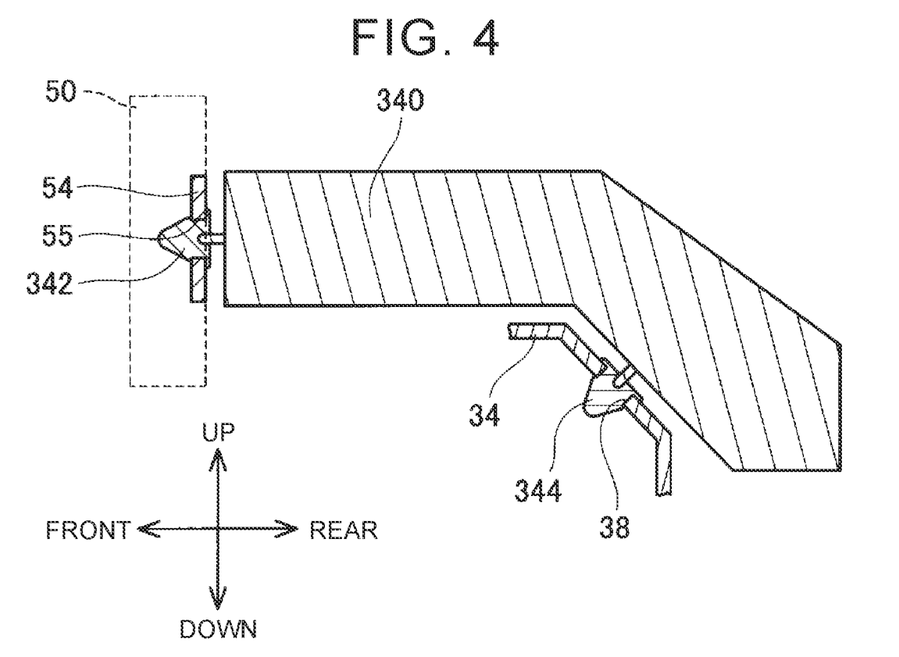
FIG. 4 is a schematic sectional view of a main part of a cross section perpendicular to the vehicle width direction, including a front clip and a rear clip provided on a side panel portion.

As illustrated in FIGS. 1 and 4, the side panel portions 340 extend toward the rear side of the vehicle with respect to the in-vehicle device 50. The side panel portions 340 are not particularly limited, but may have a curved shape in conformity with the shape of the lower instrument panel portion 34. Each of the side panel portions 340 includes a front clip 342 and a rear clip 344. The front clip 342 projects toward the front side of the vehicle from the end surface of the side panel portion 340 on the front side of the vehicle, and is fixed to the in-vehicle device 50. The rear clip 344 projects toward a lower front side of the vehicle from the bottom surface of the side panel portion 340 located on the rear side of the vehicle, and is fitted into the fitting hole 38 in the lower instrument panel portion 34.

In-vehicle Device

As illustrated in FIG. 1, the in-vehicle device 50 projects toward an upper side of the vehicle (a vehicle-upper side) with respect to the upper surface of the instrument panel 30. The in-vehicle device 50 is covered with the cover panel 40 to expose the front surface to the vehicle cabin. The in-vehicle device 50 includes a screen 50a and a support 50b. Examples of the screen 50a include a display that displays various measured values (for example, speed or engine or motor speed). The support 50b is a member attached to the back surface of the screen 50a to support the screen 50a. The support 50b is not particularly limited, but may be made of a resin. The support 50b includes a pair of fixing brackets 52 on its bottom surface, and a pair of fixing plates 54 on its side surfaces. As illustrated in FIGS. 1 and 3, the fixing brackets 52 have insertion holes 53 where fasteners such as bolts are inserted. As illustrated in FIGS. 1 and 4, the fixing plates 54 have fitting holes 55 where the front clips 342 of the side panel portions 340 are fitted. As described above, the front clips 342 of the side panel portions 340 are fitted into the fitting holes 55 of the corresponding fixing plates 54.

As illustrated in FIG. 3, the fixing brackets 52, the lower instrument panel portion 34, and the instrument panel reinforcement 20 are fixed with bolts (example of the fasteners) passing through the insertion holes 53 of the fixing brackets 52, the insertion holes 37 of the lower instrument panel portion 34, and the insertion holes 24 of the steering support 22 of the instrument panel reinforcement 20. As a result, the in-vehicle device 50 is fixed to the instrument panel reinforcement 20, that is, the vehicle via the fixing brackets 52.

Waterproof Mechanism

As described above, in the vehicle structure 10 of the present embodiment, the in-vehicle device 50 projects from the upper surface of the instrument panel 30 toward the upper side of the vehicle. Therefore, the cover panel 40 that covers the in-vehicle device 50 is located on the outermost surface. The cover panel 40 is composed of the plurality of panel portions 140, 240, and 340. In particular, the upper panel portion 140 covers the upper part of the back surface of the in-vehicle device 50, and the lower panel portion 240 covers the lower part of the back surface of the in-vehicle device 50. Therefore, a connection portion between the upper panel portion 140 and the lower panel portion 240 is positioned to face the back surface of the in-vehicle device 50. For example, when cleaning the cover panel 40, water may enter the cover panel 40 from the connection portion between the upper panel portion 140 and the lower panel portion 240 and adhere to a terminal provided on the back surface of the in-vehicle device 50. The vehicle structure 10 of the present embodiment includes a waterproof mechanism that reduces the occurrence of the case where the water that has entered the cover panel 40 adheres to the terminal provided on the back surface of the in-vehicle device 50. The waterproof mechanism will be described below.

Regulation Members 154 of In-vehicle Device 50

Figure 5:
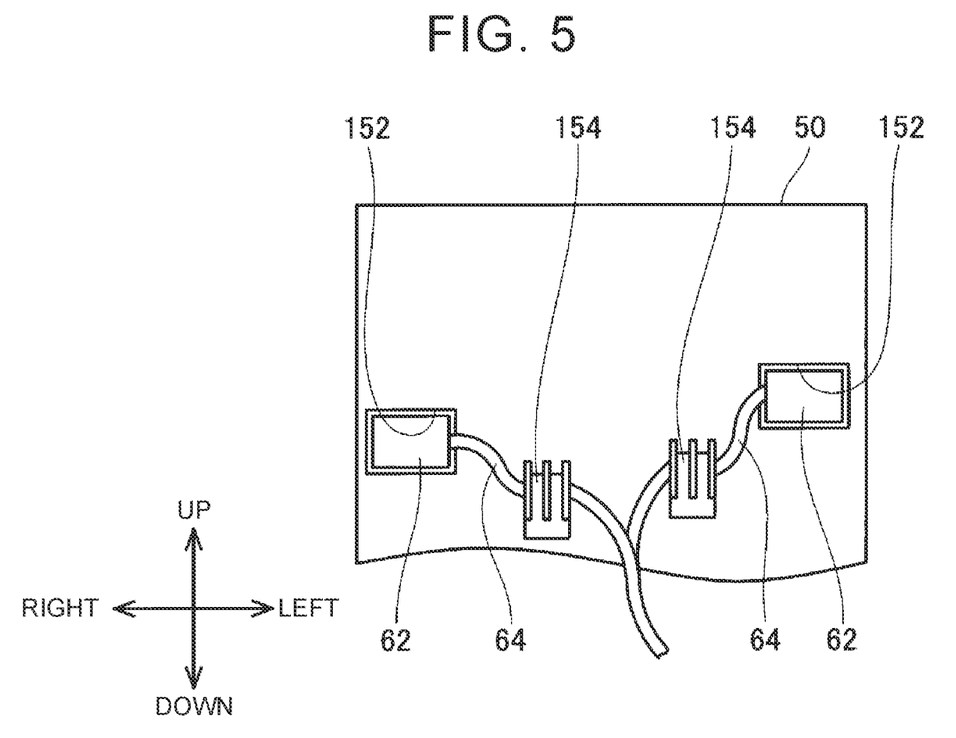
FIG. 5 is a diagram schematically illustrating the back surface of the in-vehicle device.

As illustrated in FIG. 5, a pair of terminals 152 is provided on the back surface of the support 50b of the in-vehicle device 50. Connectors 62 of harnesses 64 are connected to the corresponding terminals 152. When the connector 62 is connected to the terminal 152, the harness 64 is connected to the connector 62 on its side surface, that is, along the vehicle width direction. Electric power and specific signals are input to the in-vehicle device 50 via the harnesses 64.

Figure 6:
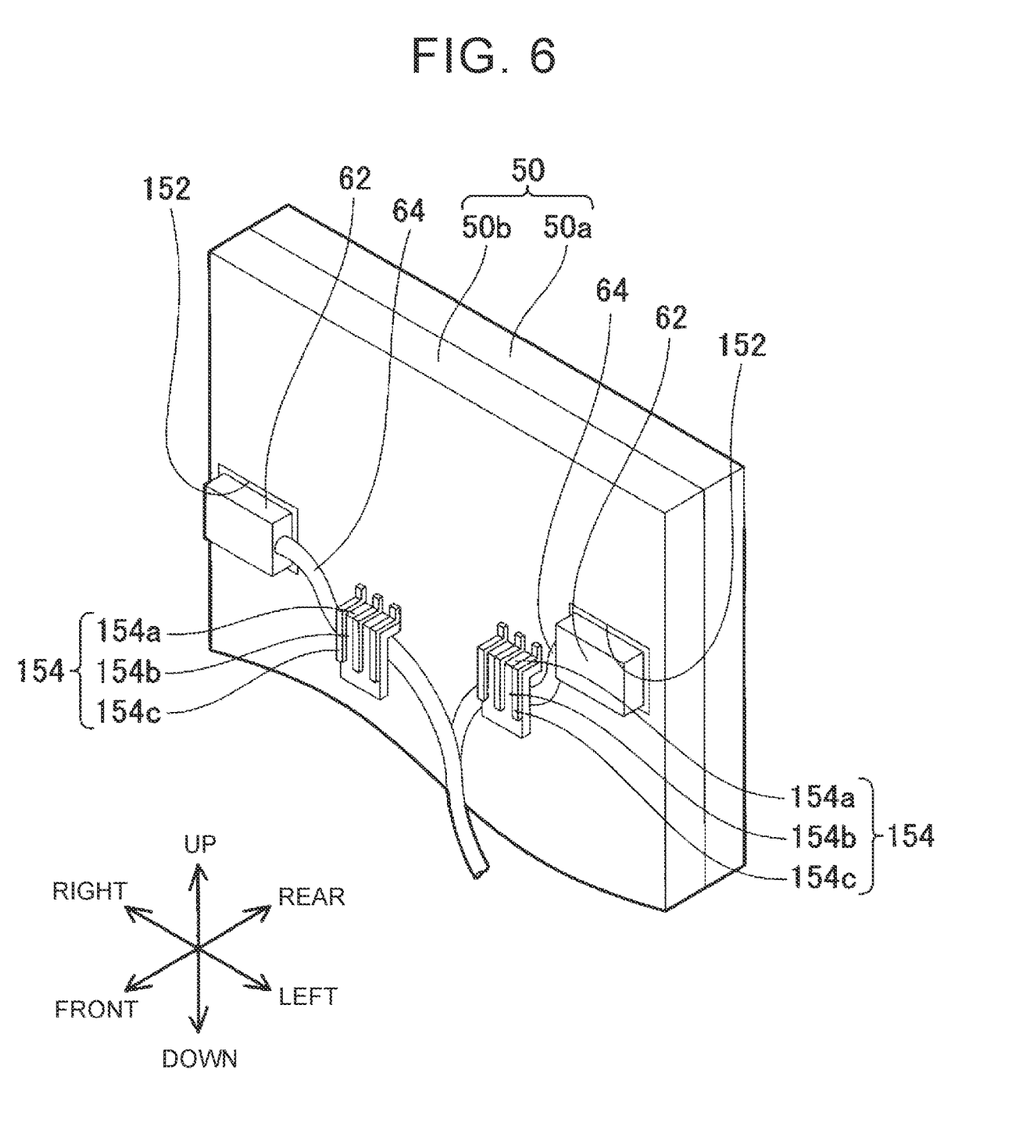
FIG. 6 is a schematic perspective view including the back surface of the in-vehicle device.

A pair of regulation members 154 is provided on the back surface of the support 50b of the in-vehicle device 50. Each of the regulation members 154 is arranged on a lower side of the vehicle (a vehicle-lower side) with respect to the corresponding terminal 152 and on a side where the regulation member 154 faces the side surface connected to the harness 64 (in this example, an inner side with respect to the corresponding terminal 152) out of the side surfaces of the connector 62 connected to the corresponding terminal 152. As illustrated in FIG. 6, each of the regulation members 154 includes an upper wall 154a, a hanging wall 154b, and a plurality of rib walls 154c. The regulation members 154 are integrated with the support 50b, and may be formed by injection molding, but are not particularly limited.

The upper wall 154a has a plate shape extending toward the front side of the vehicle from the back surface of the support 50b of the in-vehicle device 50 on the lower side of the vehicle with respect to the corresponding terminal 152. The hanging wall 154b has a plate shape extending toward the lower side of the vehicle from the upper wall 154a with the end of the hanging wall 154b on the upper side of the vehicle being connected to the end of the upper wall 154a on the front side of the vehicle. The hanging wall 154b faces the back surface of the support 50b of the in-vehicle device 50. Each of the rib walls 154c extends from the back surface of the support 50b of the in-vehicle device 50 along the hanging wall 154b toward its end on the lower side of the vehicle over the upper wall 154a. By providing the rib walls 154c, the rigidities of the upper wall 154a and the hanging wall 154b are increased. Thus, the regulation member 154 has an L-shape when viewed in the vehicle width direction.

Before or after the connector 62 is connected to the corresponding terminal 152, each of the harnesses 64 is inserted into a space defined by the upper wall 154a and the hanging wall 154b of the corresponding regulation member 154 from the lower side of the vehicle to pass through the space. A distance between the back surface of the support 50b of the in-vehicle device 50 and the hanging wall 154b is set slightly smaller than the outside diameter of the harness 64. As a result, the regulation member 154 can hold the inserted harness 64. The distance between the back surface of the support 50b of the in-vehicle device 50 and the hanging wall 154b may be set larger than the outside diameter of the harness 64.

The upper wall 154a restricts movement of the harness 64 inserted into the regulation member 154 toward the upper side of the vehicle. By further providing the hanging wall 154b, the regulation member 154 can stably hold the harness 64 inserted into the regulation member 154. Thus, the regulation member 154 can regulate the position of the harness 64 to the lower side of the vehicle with respect to the corresponding terminal 152. As a result, it is possible to reduce the occurrence of the case where the water that has entered the cover panel 40 adheres to the terminal 152 along the harness 64.

Connection Portion 102 between Upper Panel Portion 140 and Lower Panel Portion 240

Figure 7:
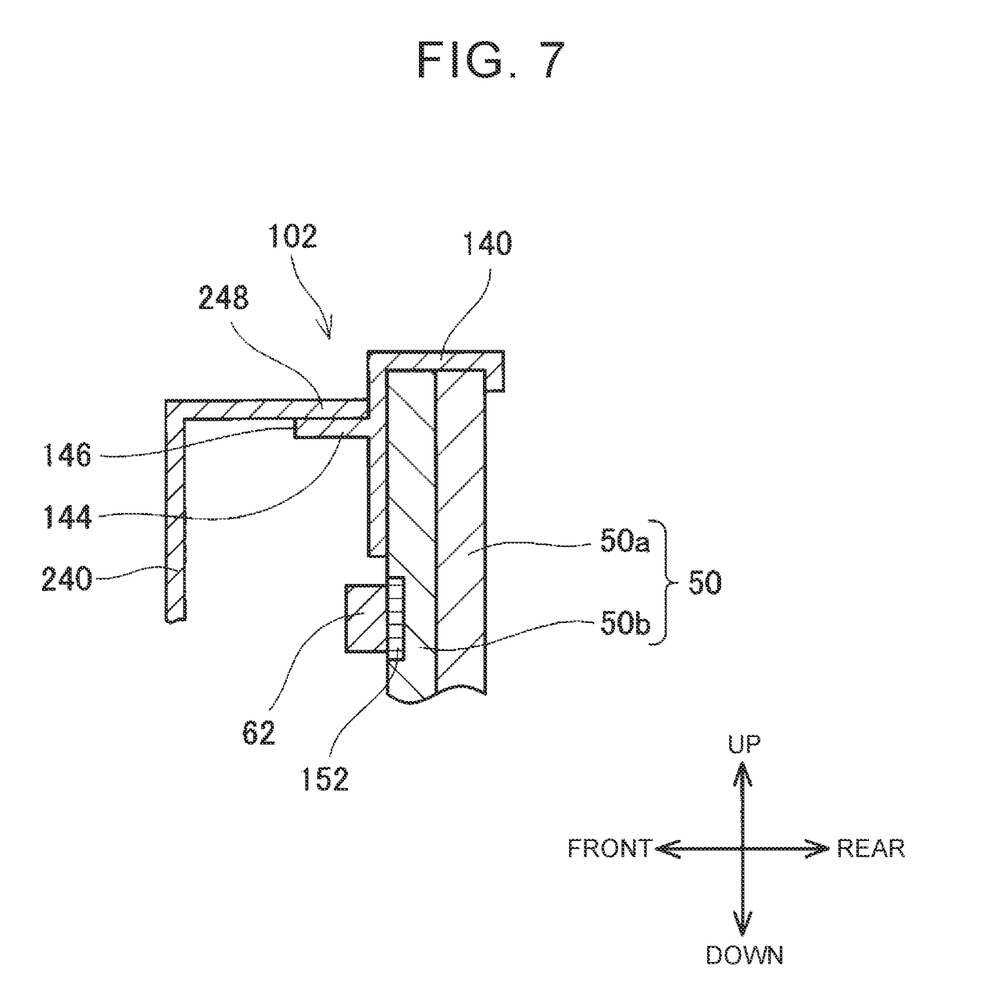
FIG. 7 is a schematic sectional view of a main part of a cross section perpendicular to the vehicle width direction, including a terminal provided on the back surface of the in-vehicle device.

As illustrated in FIG. 7, a connection portion 102 between the upper panel portion 140 and the lower panel portion 240 is positioned to face the back surface of the in-vehicle device 50. In this connection portion 102, an end 144 of the upper panel portion 140 on the front side of the vehicle (the vehicle-front side) and an end 248 of the lower panel portion 240 on the rear side of the vehicle (the vehicle-rear side) are connected to overlap each other. The end 144 of the upper panel portion 140 on the front side of the vehicle is located on the lower side of the vehicle with respect to the end 248 of the lower panel portion 240 on the rear side of the vehicle. Therefore, the water that enters the cover panel 40 from the connection portion 102 passes between the end 144 of the upper panel portion 140 on the front side of the vehicle and the end 248 of the lower panel portion 240 on the rear side of the vehicle, and drops from a tip 146 of the upper panel portion 140 on the front side of the vehicle.

As illustrated in FIG. 7, the tip 146 of the upper panel portion 140 on the front side of the vehicle in the connection portion 102 is positioned on the front side of the vehicle with respect to the connector 62 of the harness 64 in a cross section perpendicular to the vehicle width direction. Therefore, it is possible to reduce the occurrence of the case where the water dropping from the connection portion 102 adheres to the terminal 152 along the connector 62 of the harness 64.

Figure 8:
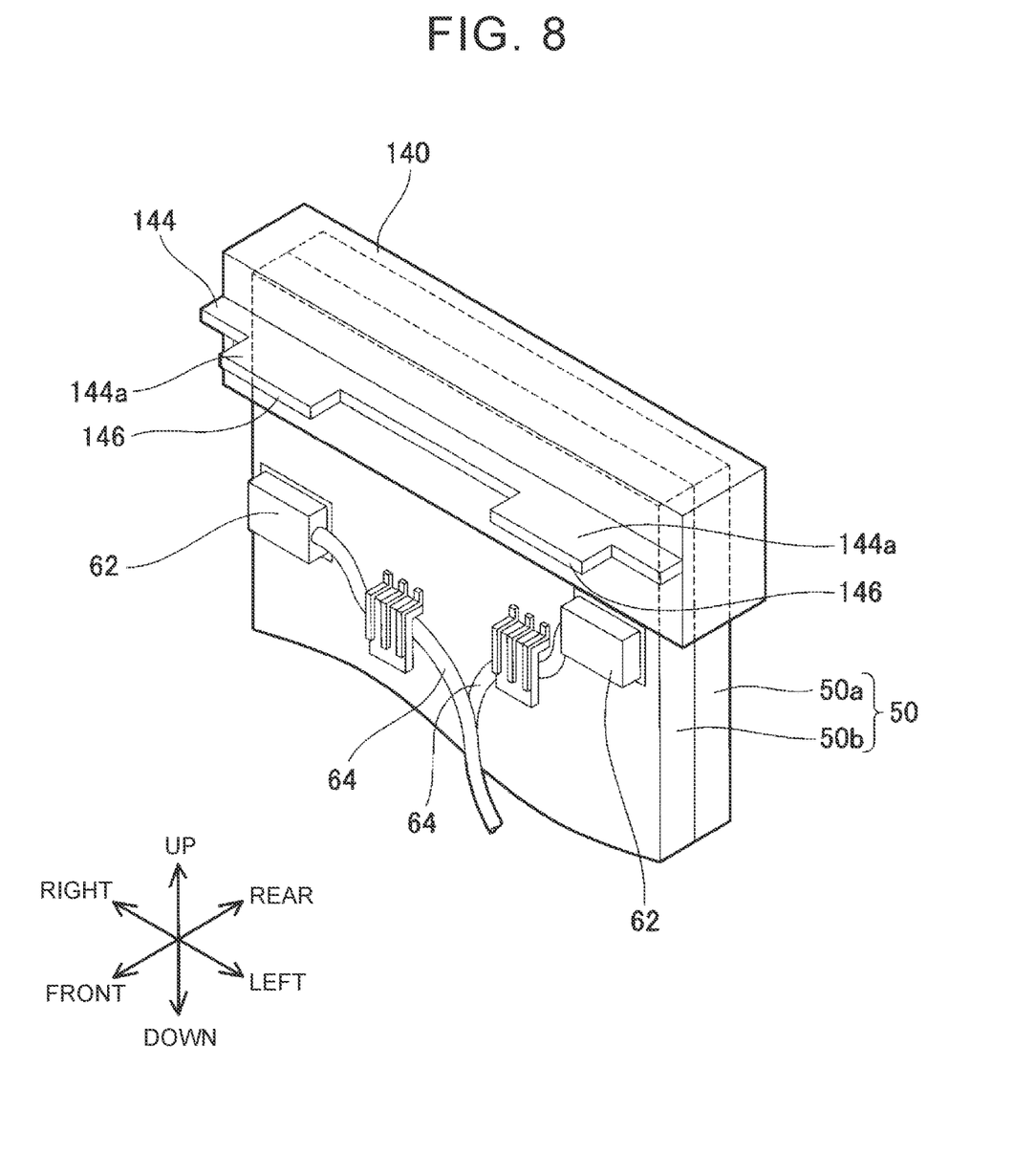
FIG. 8 is a schematic exploded perspective view including the back surface of the in-vehicle device, illustrating a state in which the upper panel portion is attached to the in-vehicle device.

FIG. 8 illustrates the shape of the end 144 of the upper panel portion 140 on the front side of the vehicle. In FIG. 8, the components such as the clips 142 (see FIG. 2) provided on the upper panel portion 140 are partially omitted for the purpose of clear illustration. As illustrated in FIG. 8, the end 144 of the upper panel portion 140 on the front side of the vehicle includes a plurality of projections 144a projecting toward the front side of the vehicle. When viewed from the upper side of the vehicle, the projection 144a is positioned in correspondence with the connector 62 of the harness 64. As a result, such a shape is obtained that the tip 146 of the upper panel portion 140 on the front side of the vehicle is positioned on the front side of the vehicle with respect to the connector 62 of the harness 64.

Although the specific examples of the technology disclosed herein are described in detail above, the examples are only illustrative and are not intended to limit the scope of the claims. The technology described in the claims includes various modifications and alterations of the specific examples described above. The technical elements described herein or illustrated in the drawings exhibit technical utility solely or in various combinations, and are not limited to the combination described in the claims as filed. The technologies described herein or illustrated in the drawings may simultaneously achieve a plurality of objects, and exhibit technical utility by achieving one of the objects.

What is claimed is:

1. A vehicle structure comprising:
   an instrument panel;
   an in-vehicle device projecting toward a vehicle-upper side with respect to an upper surface of the instrument panel; and
   a cover panel configured to cover the in-vehicle device to expose a front surface of the in-vehicle device to a vehicle cabin, wherein:
   the cover panel includes:
      an upper panel portion facing at least an upper part of a back surface of the in-vehicle device; and
      a lower panel portion facing at least a lower part of the back surface of the in-vehicle device and connected to the upper panel portion; and
   the in-vehicle device includes:
      a terminal provided on the back surface and configured such that a connector of a harness is connectable to the terminal; and
      a regulation member configured to regulate a position of the harness to a vehicle-lower side with respect to the terminal when the connector is connected to the terminal.

2. The vehicle structure according to claim 1, wherein:
   the regulation member includes a plate member projecting from the back surface on the vehicle-lower side with respect to the terminal; and
   the plate member is configured to restrict movement of the harness toward the vehicle-upper side.

3. The vehicle structure according to claim 1, wherein, when the connector is connected to the terminal, the harness is connected to the connector along a vehicle width direction.

4. The vehicle structure according to claim 1, wherein:
   in a connection portion where the upper panel portion and the lower panel portion are connected together, an end of the upper panel portion on a vehicle-front side is located on the vehicle-lower side with respect to an end of the lower panel portion on a vehicle-rear side; and
   a tip of the upper panel portion on the vehicle-front side in the connection portion is positioned on the vehicle-front side with respect to the connector of the harness in a cross section perpendicular to a vehicle width direction.

5. The vehicle structure according to claim 4, wherein, when viewed from the vehicle-upper side, the end of the upper panel portion on the vehicle-front side projects at a position in correspondence with the terminal of the in-vehicle device.

* * * * *